US010346508B2

(12) United States Patent
Amin et al.

(10) Patent No.: US 10,346,508 B2
(45) Date of Patent: Jul. 9, 2019

(54) RE-EQUILIBRATED QUANTUM SAMPLING

(71) Applicant: D-Wave Systems Inc., Burnaby (CA)

(72) Inventors: Mohammad H. Amin, Coquitlam (CA); Evgeny A. Andriyash, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 0 days.

(21) Appl. No.: 15/870,411

(22) Filed: Jan. 12, 2018

(65) Prior Publication Data

US 2018/0196780 A1    Jul. 12, 2018

Related U.S. Application Data

(60) Provisional application No. 62/445,496, filed on Jan. 12, 2017, provisional application No. 62/447,904, filed on Jan. 18, 2017.

(51) Int. Cl.

| *G06F 17/17* | (2006.01) |
| *G06F 17/18* | (2006.01) |
| *G06F 9/30*  | (2018.01) |
| *G06F 17/13* | (2006.01) |
| *G06F 5/01*  | (2006.01) |

(Continued)

(52) U.S. Cl.
CPC ........... *G06F 17/17* (2013.01); *G06F 5/01* (2013.01); *G06F 9/30145* (2013.01); *G06F 17/13* (2013.01); *G06F 17/18* (2013.01); *G06N 7/005* (2013.01); *G06N 10/00* (2019.01); *H04L 9/0852* (2013.01)

(58) Field of Classification Search
USPC .............................................. 708/3
See application file for complete search history.

(56) References Cited

U.S. PATENT DOCUMENTS

| 7,135,701 | B2 | 11/2006 | Amin et al. |
| 7,418,283 | B2 | 8/2008  | Amin |

(Continued)

FOREIGN PATENT DOCUMENTS

| WO | 2016/029172 A1 | 2/2016 |
| WO | 2017/075246 A1 | 5/2017 |

OTHER PUBLICATIONS

Lanting et al., "System and Methods for Quantum Computation Employing Classical Spin Preparation and Reverse Annealing," U.S. Appl. No. 62/417,940, filed Nov. 4, 2016, 69 pages.

*Primary Examiner* — Tan V Mai
(74) *Attorney, Agent, or Firm* — Cozen O'Connor

(57) ABSTRACT

The systems, devices, articles, and methods generally relate to sampling from an available probability distribution. The samples maybe used to create a desirable probability distribution, for instance for use in computing values used in computational techniques including: Importance Sampling and Markov chain Monte Carlo systems. An analog processor may operate as a sample generator, for example by: programming the analog processor with a configuration of the number of programmable parameters for the analog processor, which corresponds to a probability distribution over qubits of the analog processor, evolving the analog processor with a fast ramp operation, and reading out states for the qubits. The state for the qubits may be post processes and/or used to calculate importance weights.

20 Claims, 6 Drawing Sheets

(51) Int. Cl.
*G06N 10/00* (2019.01)
*G06N 7/00* (2006.01)
*H04L 9/08* (2006.01)

(56) References Cited

U.S. PATENT DOCUMENTS

| | | |
|---|---|---|
| 7,533,068 B2 | 5/2009 | Maassen van den Brink et al. |
| 8,008,942 B2 | 8/2011 | van den Brink et al. |
| 8,190,548 B2 | 5/2012 | Choi |
| 8,195,596 B2 | 6/2012 | Rose et al. |
| 8,421,053 B2 | 4/2013 | Bunyk et al. |
| 2015/0161524 A1 | 6/2015 | Hamze |
| 2015/0269124 A1 | 9/2015 | Hamze et al. |
| 2017/0177534 A1* | 6/2017 | Mohseni .............. H03K 19/195 |
| 2018/0088647 A1* | 3/2018 | Suryanarayanan ..... G06F 1/266 |

* cited by examiner

RE-EQUILIBRATED QUANTUM SAMPLING

FIELD

The present techniques generally relate to sampling from statistical distributions and using the samples in computational tasks, such as those performed by a computational system comprising a quantum processor.

Sampling

Throughout this specification and the appended claims, the terms "sample", "sampling", "sampling device", and "sample generator" are used. These terms are used herein in like manner to their corresponding uses in the arts of statistics and statistical analysis, and electrical engineering.

In statistics, a sample is a subset of a population, i.e., a selection of data taken from a statistical population. Sampling is the process of taking the sample, and typically follows a defined procedure. For example, in a population, database, or collection of objects, a sample may refer to an individual datum, data point, object, or subset of data, data points, and/or objects.

In electrical engineering and related disciplines, sampling relates to taking a set of measurements of an analog signal or some other physical system. Sampling may include conversion of a continuous signal to a discrete signal.

In many fields, including simulations of physical systems, and computing, especially analog computing, the foregoing meanings may merge. For example, a hybrid computer can draw samples from an analog computer. The analog computer, as a provider of samples, is an example of a sample generator. The analog computer can be operated to provide samples from a selected probability distribution, the probability distribution assigning a respective probability of being sampled to each data point in the population.

An analog processor, for example a quantum processor and in particular a quantum processor designed to perform quantum annealing and/or adiabatic quantum computation, may be operated as a sample generator. The population can correspond to all possible states of the processor, and each sample can correspond to a respective state of the processor. Using an analog processor as a sample generator may be a preferred mode of operating the processor for certain applications. Operating an analog processor as a sample generator may also enable a broader range of problems to be solved compared to, for example, using an analog processor to find a low energy state of a Hamiltonian that encodes an optimization problem.

Importance Sampling

Importance sampling is a technique for estimating properties of a distribution of interest, by drawing samples from a different distribution, and weighting the samples as needed to recover the distribution of interest. When combined with the normalization constants of both distributions, the resulting estimator can be unbiased. Alternatively, one can normalize the estimator by the sum of the weights to yield an asymptotically unbiased estimator.

Consider the expectation values of a function h(x) over a distribution of interest, $\pi(x)$, also called the target distribution:

$$I = \int h(x)\pi(x)dx \quad (1)$$

Another distribution, the proposal distribution q(x), can be introduced into equation (1), provided q(x) is strictly positive with respect to $\pi(x)$. In this case, the integral becomes:

$$I = \int h(x)\frac{\pi(x)}{q(x)}q(x)dx \quad (2)$$

The factor $w(x)=\pi(x)/q(x)$ can be called the importance weight. Since each of the distributions $\pi(x)$ and q(x) may only be known to within a respective constant factor, a new weight can be defined as follows $\tilde{w}(x)=\tilde{\pi}(x)/\tilde{q}(x)$ where the tilde ~ denotes the absence of normalization for the distributions.

The integral in equation (2) can be approximated by a discrete sum over samples from the distribution. For N samples, an unbiased estimate of the integral is given by:

$$\hat{I} = \frac{\sum_{i=1}^{N} h(X^{(i)})\tilde{w}(X^{(i)})}{\sum_{i=1}^{N} \tilde{w}(X^{(i)})} \quad (3)$$

A challenge in importance sampling can be finding a suitable proposal distribution q(x). A poor choice of proposal can result in a large variance, which means that an undesirably large number of samples must be drawn from the proposal distribution q(x) before the weighted set is representative of the target distribution $\pi(x)$. As the number of dimensions in the distribution increases, the problem can become more pronounced.

Markov Chain Monte Carlo

Markov Chain Monte Carlo (MCMC) is a class of computational techniques which include, for example, simulated annealing, parallel tempering, population annealing, and other techniques. A Markov chain may be used, for example when a probability distribution cannot be used. A Markov chain may be described as a sequence of discrete random variables, and/or as a random process where at each time step the state only depends on the previous state. When the chain is long enough, aggregate properties of the chain, such as the mean, can match aggregate properties of a target distribution.

The Markov chain can be obtained by proposing a new point according to a Markovian proposal process (generally referred to as an "update operation"). The new point is either accepted or rejected. If the new point is rejected, then a new proposal is made, and so on. New points that are accepted are ones that make for a probabilistic convergence to the target distribution. Convergence is guaranteed if the proposal and acceptance criteria satisfy detailed balance conditions and the proposal satisfies the ergodicity requirement. Further, the acceptance of a proposal can be done such that the Markov chain is reversible, i.e., the product of transition rates over a closed loop of states in the chain is the same in either direction. A reversible Markov chain is also referred to as having detailed balance. Typically, in many cases, the new point is local to the previous point.

Superconducting Qubits

Superconducting qubits are solid state qubits based on circuits of superconducting materials. Operation of superconducting qubits is based on the underlying principles of magnetic flux quantization, and Josephson tunneling. Superconducting effects can be present in different configurations, and can give rise to different types of superconducting qubits including flux, phase, charge, and hybrid qubits. The different configurations can vary in the topology of the loops, the placement of the Josephson junctions, and the physical parameters of elements of the superconducting circuits, such as inductance, capacitance, and Josephson junction critical current.

Quantum Processor

A quantum processor may take the form of a superconducting quantum processor. A superconducting quantum processor may include a number of superconducting qubits and associated local bias devices. A superconducting quantum processor may also include coupling devices (also known as couplers) that selectively provide communicative coupling between qubits.

In one implementation, the superconducting qubit includes a superconducting loop interrupted by a Josephson junction. The ratio of the inductance of the Josephson junction to the geometric inductance of the superconducting loop can be expressed as $2\pi L I_C/\Phi_0$ (where L is the geometric inductance, $I_C$ is the critical current of the Josephson junction, and $\Phi_0$ is the flux quantum). The inductance and the critical current can be selected, adjusted, or tuned, to increase the ratio of the inductance of the Josephson junction to the geometric inductance of the superconducting loop, and to cause the qubit to be operable as a bistable device. In some implementations, the ratio of the inductance of the Josephson junction to the geometric inductance of the superconducting loop of a qubit is approximately equal to three.

In one implementation, the superconducting coupler includes a superconducting loop interrupted by a Josephson junction. The inductance and the critical current can be selected, adjusted, or tuned, to decrease the ratio of the inductance of the Josephson junction to the geometric inductance of the superconducting loop, and to cause the coupler to be operable as a monostable device. In some implementations, the ratio of the inductance of the Josephson junction to the geometric inductance of the superconducting loop of a coupler is approximately equal to, or less than, one.

Further details and embodiments of exemplary quantum processors that may be used in conjunction with the present systems and devices are described in, for example, U.S. Pat. Nos. 7,533,068; 8,008,942; 8,195,596; 8,190,548; and 8,421,053.

Adiabatic Quantum Computation

A Hamiltonian is an operator whose eigenvalues are the allowed energies of the system. Adiabatic quantum computation can include evolving a system from an initial Hamiltonian to a final Hamiltonian by a gradual change. One example of adiabatic evolution is a linear interpolation between the initial Hamiltonian $H_i$ and the final Hamiltonian $H_f$ as follows:

$$H_e = (1-s)H_i + sH_f \qquad (4)$$

where $H_e$ is the evolution, or instantaneous, Hamiltonian, and s is an evolution coefficient that can control the rate of evolution.

As the system evolves, the evolution coefficient s changes value from 0 to 1. At the start, the evolution Hamiltonian $H_e$ is equal to the initial Hamiltonian $H_i$, and, at the end, the evolution Hamiltonian $H_e$ is equal to the final Hamiltonian $H_f$.

The system is typically initialized in a ground state of the initial Hamiltonian $H_i$, and the goal of the adiabatic evolution is to evolve the system such that it ends up in a ground state of the final Hamiltonian $H_f$ at the end of the evolution. If the evolution is too fast, then the system can transition to a higher energy state of the system, such as the first excited state.

The process of changing the Hamiltonian in adiabatic quantum computing may be referred to as evolution. An adiabatic evolution is an evolution that satisfies an adiabatic condition such as:

$$\dot{s} | \langle 1 | dH_e/ds | 0 \rangle | = \delta g^2(s) \qquad (5)$$

where $\dot{s}$ is the time derivative of s, g(s) is the difference in energy between the ground state and first excited state of the system (also referred to herein as the gap size) as a function of s, and $\delta$ is a coefficient and $\delta \ll 1$.

If the rate of change (for example, $\dot{s}$), is slow enough that the system is always in the instantaneous ground state of the evolution Hamiltonian, then transitions at anti-crossings (i.e., when the gap size is smallest) are avoided. Equation (4) above is an example of a linear evolution schedule. Other evolution schedules can be used, including non-linear, parametric, and the like. Further details on adiabatic quantum computing systems, methods, and apparatus are described in, for example, U.S. Pat. Nos. 7,135,701; and 7,418,283.

Quantum Annealing

Quantum annealing is a computation method that may be used to find a low-energy state of a system, for example the ground state of the system. Similar in concept to classical simulated annealing, the method relies on an underlying principle that natural systems tend towards lower energy states because lower energy states are more stable. While classical annealing uses classical thermal fluctuations to guide a system to a low-energy state and ideally its global energy minimum, quantum annealing may use quantum effects, such as quantum tunneling, as a source of disordering to reach a global energy minimum more accurately and/or more quickly than classical annealing. In quantum annealing thermal effects and other noise may be present, and the final low-energy state may not be the global energy minimum.

Adiabatic quantum computation may be considered a special case of quantum annealing for which the system, in an ideal implementation, begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing can use quantum mechanics as a source of disorder during the annealing process. An objective function, such as an optimization problem, can be encoded in a problem Hamiltonian $H_P$, and the method can introduce quantum effects by adding a disordering Hamiltonian $H_D$ that does not commute with the problem Hamiltonian $H_P$. An example case is as follows:

$$H_E = A(t)H_D B(t)H_P \qquad (6)$$

where A(t) and B(t) are time-dependent envelope functions. For example, A(t) can be a function that changes from a large initial value to substantially zero during the evolution. In this case, $H_E$ may be thought of as an evolution Hamiltonian similar to $H_e$ described above in the context of adiabatic quantum computation.

The disorder is slowly removed by reducing the impact of $H_D$ through a reduction in the value of A(t) over time. In this respect, quantum annealing can be similar to adiabatic quantum computation in that the system starts with an initial Hamiltonian, and evolves through an evolution Hamiltonian to a final problem Hamiltonian $H_P$ whose ground state encodes a solution to the problem.

If the evolution is slow enough, the system may settle in a global minimum, or in a local minimum close in energy to the global minimum. The performance of the computation may be assessed via a residual energy as a function of evolution time. The computation time can be defined as the time required for the residual energy to fall below a predetermined threshold.

In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of disordering Hamiltonian $H_D$ in quantum annealing may follow a defined schedule known as an annealing schedule. Unlike adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem. The method can include adding a disordering Hamiltonian $H_D$ and subsequently removing it as described above.

The techniques and structures described herein generally relate to sampling from an available probability distribution to create a desirable probability distribution. This resultant distribution can be used for computing values used in computational techniques including: Importance Sampling and Markov chain Monte Carlo systems.

BRIEF SUMMARY

A method of operation of a hybrid computing system to generate approximate equilibrium statistics, the hybrid computing system comprising an analog processor and a digital processor, can be summarized as including: determining an intermediate value of an annealing parameter, the annealing parameter normalized between a value of zero and a value of one; determining a ramp time $t_{ramp}$ wherein $t_{ramp}$ is smaller than the relaxation time of the analog processor and greater than a time needed for non-adiabatic transition to higher energy states; initializing the analog processor in a first state; evolving the analog processor from a value of one for the annealing parameter until the annealing parameter is equal to the intermediate value, wherein evolving the analog processor from a value of one for the annealing parameter until the annealing parameter is equal to the intermediate value occurs in the ramp time; holding the annealing parameter of the analog processor to the intermediate value for a predetermined dwell time; evolving the analog processor from the intermediate value of the annealing parameter until the annealing parameter is equal to one, wherein evolving the analog processor from the intermediate value of the annealing parameter until the annealing parameter is equal to one occurs in the ramp time and after the ramp time the analog processor is in a second state; and reading out the second state of the analog processor.

Determining an intermediate value of an annealing parameter may include determining a value of the annealing parameter where the evolution of the analog processor starts deviating toward a distribution that is not a Boltzmann distribution.

Initializing the analog processor in a first state may include initializing the state of the analog processor via the digital processor to correspond to a distribution of interest.

Initializing, the analog processor in a first state may include evolving the analog processor from an end state of a previous annealing operation.

The dwell time may be a time greater than a time needed for the evolution of the analog processor to recover from any distortion caused by evolving the analog processor by the ramp time.

Reading out the second state of the analog processor may include reading out the second state of the analog processor with the digital processor.

The second state may not be equal the first state.

The second state may be a sample from a distribution obtained from an evolution in $t_{ramp}$ from a thermal equilibrium distribution $$P_\beta(z) = \frac{e^{-\beta E(z)}}{Z_\beta}.$$

The method may further include: after reading out the second state of the analog processor, post-processing the second state via the digital processor to obtain a third state of the analog processor.

Post-processing the second state of the quantum processor may include applying one or more passes of quantum Monte Carlo simulations to the second state.

The method may further include: assigning importance weights to the third state of the analog processor via the digital processor.

A hybrid computing system to generate approximate equilibrium statistics, the hybrid computing system comprising an analog processor and a digital processor, may execute any of the acts described above.

A method of operation of a hybrid computing system to generate approximate equilibrium statistics, the hybrid computing system comprising an analog processor and a digital processor, may be summarized as including: initializing a counter i to i=0; determining an intermediate value $s_i^*$ of an annealing parameter, the annealing parameter normalized between a value of zero and a value of one; determining a ramp time $t_{ramp}$ wherein $t_{ramp}$ is smaller than the relaxation time of the analog processor and greater than the time needed for non-adiabatic transition to higher energy states; initializing, the analog processor to a state i; Iterating until an exit condition is met: evolving the analog processor from a value of one for the annealing parameter until the annealing parameter is equal to $s_i^*$, wherein evolving the analog processor from a value of one for the annealing parameter until the annealing parameter is equal to the intermediate value occurs in the ramp time; holding the annealing parameter of the analog processor to $s_i^*$ for a defined dwell time; evolving the analog processor from $s_i^*$ of the annealing parameter until the annealing parameter is equal to one, wherein evolving the analog processor from the intermediate value of the annealing parameter until the annealing parameter is equal to one occurs in the ramp time and after the ramp time the analog processor is in a state i+1; and reading out the state i+1 of the analog processor; if the exit condition is not met, determining a new value $s_{i+1}^* > s_i^*$ of the annealing parameter; and updating the counter i to i=i+1.

Determining an intermediate value of an annealing parameter, the annealing parameter normalized between a value of zero and a value of one may include determining a value of the annealing parameter where the evolution of the analog processor starts deviating toward a distribution that is not a Boltzmann distribution.

The dwell time may be a time greater than the time needed for the evolution of the analog processor to recover from any distortion caused by evolving the analog processor by the ramp time.

Reading out the state i=1 of the analog processor may include reading out the state i+1 of the analog processor with the digital processor.

The state i+1 may not be equal the state i.

The state i+1 may be a sample from a distribution obtained from an evolution in $t_{ramp}$ from a thermal equilibrium distribution $$P_\beta(z) = \frac{e^{-\beta E(z)}}{Z_\beta}.$$

The method may further include: after reading out the state i+1 of the analog processor, post-processing the state i+1 via the digital processor to obtain a post-processed state i+1 of the analog processor.

Post-processing the state i+1 of the quantum processor may include applying one or more passes of quantum Monte Carlo simulations to the state i+1.

The method may further include: assigning importance weights to the post-processed state i+1 of the analog processor via the digital processor; and initializing, by the digital processor, the analog processor to the post-processed state i+1.

The method may further include: after reading out the state i+1 of the analog processor storing the state i+1 via the digital processor; and after meeting the exit condition post processing the states of the analog processor via the digital processor to obtain importance weights.

Post processing the state of the analog processor via the digital processor may include performing one or more passes of quantum Monte Carlo post processing.

A hybrid computing system to generate approximate equilibrium statistics, the hybrid computing system comprising an analog processor and a digital processor, may execute any of the acts described above.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
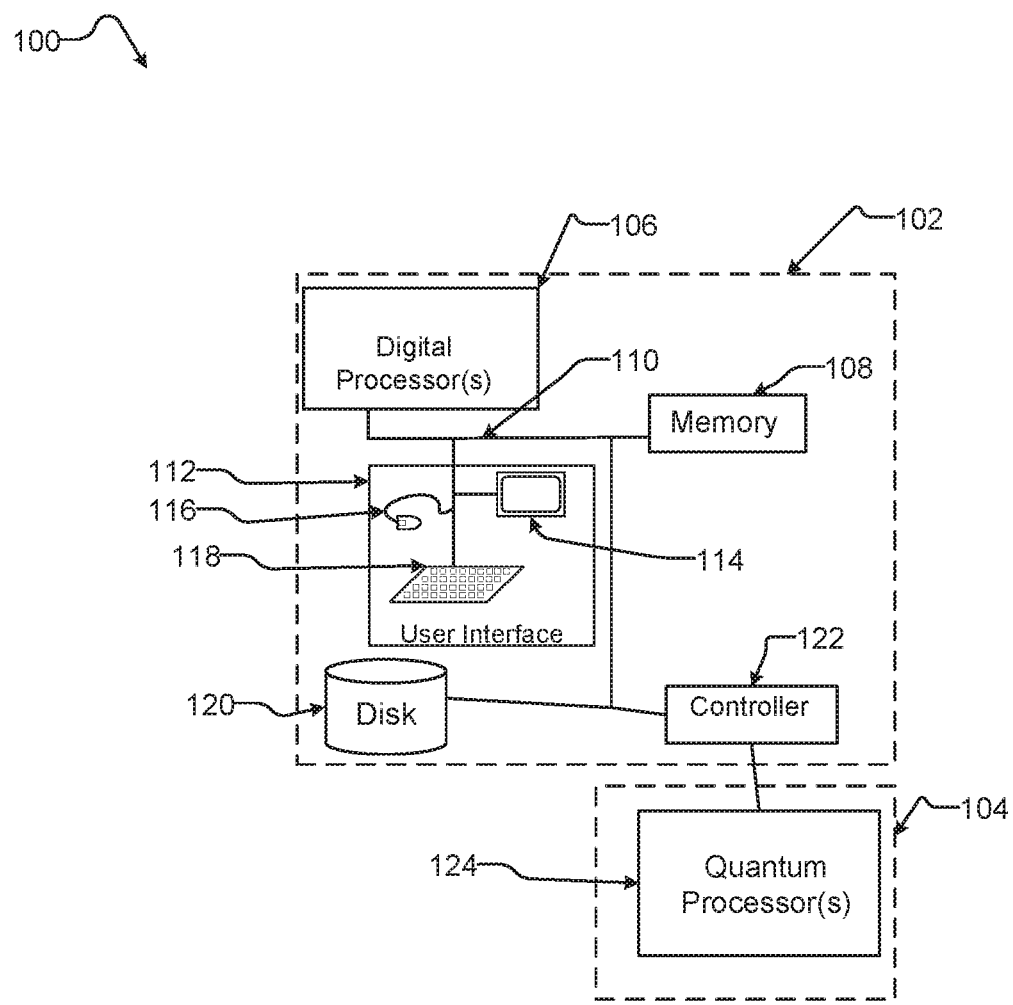
FIG. 1 is a schematic diagram of an exemplary hybrid computing system including a digital processor and an analog processor useful in performing the methods described in the present disclosure.

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors and drive circuitry have not been shown or described in detail to avoid unnecessarily obscuring descriptions of the embodiments of the present methods. Throughout this specification and the appended claims, the words "element" and "elements" are used to encompass, but are not limited to, all such structures, systems, and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" "an embodiment", "another embodiment", "one example", "an example", or "another example" means that a particular referent feature, structure, or characteristic described in connection with the embodiment or example is included in at least one embodiment or example. Thus, the appearances of the phrases "in one embodiment", "in an embodiment", "another embodiment" or the like in various places throughout this specification are not necessarily all referring to the same embodiment or example. Furthermore, the particular features, structures, or characteristics may be combined in any suitable manner in one or more embodiments or examples.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

Overview

Sampling from a Boltzmann distribution of a classical or quantum Hamiltonian can be challenging. The statistical nature of an open physical quantum annealer, such as a quantum annealing processor or an adiabatic quantum computer, can be exploited for sampling purposes.

Typically, it is a challenge for a quantum annealer to be able to equilibrate quickly enough at points during the annealing process to provide equilibrium samples efficiently. One approach to mitigating this challenge is to combine the use of a quantum processor performing quantum annealing with the use of a classical or digital processor performing classical methods.

One way to combine the use of a quantum processor and a classical or digital processor is to use post-processing techniques (such as described in International PCT Application WO2016029172A1 "Systems and Methods for Problem Solving, Useful For Example In Quantum Computing"). Typically, the amount of post-processing needed to achieve a desired accuracy can become large enough that it at least partially negates the benefit of obtaining initial samples from the quantum processor.

The present systems, devices, articles, and methods relate to sampling from an available probability distribution and making use of the samples. Sampling can be performed via a digital computer on its own, or performed via a digital computer in cooperation with an analog computer, such as, a quantum computer. FIG. 1 shows a digital computer communicatively coupled to a quantum computer. Use of a quantum computer for sampling may advantageously allow samples to be taken from many disparate low energy states.

FIG. 1 illustrates a hybrid computing system 100 including a digital computer 102 coupled to an analog computer 104. In some implementations the analog computer 104 is a quantum computer. The exemplary digital computer 102 includes a digital processor 106 that may be used to perform classical digital processing tasks.

Digital computer 102 may include at least one digital processor 106 with one or more cores, at least one system memory 108, and at least one system bus 110 that couples various system components, including system memory 108 to digital processor 106.

The digital processor 106 may be any circuitry that forms a logic processing unit, such as one or more central processing units ("CPUs"), graphics processing units ("GPUs"), digital signal processors ("DSPs"), application-specific integrated circuits ("ASICs"), programmable gate arrays ("FPGAs"), programmable logic controllers (PLCs), etc.

Digital computer 102 may include a user input/output subsystem 112. In some implementations, the user input/output subsystem includes one or more user input/output components such as a display 114, mouse 116, and/or keyboard 118.

System bus 110 can employ any known bus structures or architectures, including a memory bus with a memory controller, a peripheral bus, and a local bus. System memory 108 may include non-volatile memory, such as read-only memory ("ROM"), static random access memory ("SRAM"), Flash NAND; and volatile memory such as random access memory ("RAM") (not shown).

Digital computer 102 may also include other non-transitory computer- or processor-readable storage media or non-volatile memory 120. Non-volatile memory 120 may take a variety of forms, including: spinning media for instance a hard disk drive (HDD) for reading from and writing to a magnetic hard disk and/or an optical disk drive for reading from and writing to removable optical disks, and/or non-spinning media for instance a solid state drive (SSD) for reading from and writing to solid state memory. The optical disk can be a CD-ROM or DVD, while the magnetic disk can be a magnetic floppy disk or diskette or one or more magnetic disc platters. Non-volatile memory 120 may communicate with digital processor via system bus 110 and may include appropriate interfaces or controllers 122 coupled to system bus 110. Non-volatile memory 120 may serve as long-term storage for processor- or computer-readable instructions, data structures, or other data (sometimes called program modules) for digital computer 102.

Although digital computer 102 has been described as employing hard disks, optical disks and/or magnetic disks, those skilled in the relevant art will appreciate that other types of non-volatile computer-readable media may be employed, such magnetic cassettes, flash memory cards, Flash, ROMs, smart cards, etc. Those skilled in the relevant art will appreciate that some computer architectures employ volatile memory and non-volatile memory. For example, data in volatile memory can be cached to non-volatile memory or in a solid-state drive that employs integrated circuits to provide non-volatile memory.

Various processor- or computer-readable instructions, data structures, or other data can be stored in system memory 108. For example, system memory 108 may store instruction for communicating with remote clients and scheduling use of resources including resources on the digital computer 102 and analog computer 104.

In some implementations system memory 108 may store processor- or computer-readable calculation instructions to perform pre-processing, co-processing, and post-processing to analog computer 104. System memory 108 may store at set of analog computer interface instructions to interact with the analog computer 104.

Analog computer 104 may include an analog processor such as quantum processor 124. The analog computer 104 can be provided in an isolated environment, for example, in an isolated environment that shields the internal elements of the quantum computer from heat, magnetic field, and other external noise (not shown) and/or which cools the analog processor to temperatures (i.e., critical temperature) at or below which the circuitry of the analog processor becomes superconductive. In contrast, the digital computer 102 will typically operate at much higher temperatures (e.g., room temperature) at which superconductivity does not occur and/or may employ materials that do not superconduct even at or below the critical temperature.

The systems and methods described in this document can generate weighted samples from a quantum Boltzmann distribution with a moderate amount of post-processing. The methods comprise generating samples using a quantum annealing processor and performing annealed importance sampling, and is referred to herein as quantum importance sampling.

Sampling from a Classical Distribution

A thermal equilibrium probability distribution can be expressed as follows:

$$P_\beta(z) = \frac{e^{-\beta E(z)}}{Z_\beta} \tag{7}$$

where $\beta=1/k_B T$, $k_B$ is the Boltzmann constant, T is temperature, E(z) is the classical energy corresponding to a state $z \in \{-1, +1\}^N$, and $Z_\beta = \Sigma_z e^{-\beta E(z)}$ is the partition function.

This distribution can be reached by stochastic processes such as Metropolis algorithm or Markov chain Monte Carlo (MCMC), which can be represented by a transition matrix $P_\beta(z|z')$. A very large number of applications of such algorithms, starting from any random state, might be able to give $P_\beta(z)$ with an acceptable degree of accuracy. For that to hold, $P_\beta(z)$ should be a stationary state of such a process, or an eigenfunction of $P_\beta(z|z')$ with eigenvalue 1:

$$P_\beta(z) = \sum_{z'} P_\beta(z|z') P_\beta(z') \qquad (8)$$

The detailed balance condition, i.e. $P_\beta(z|z')P_\beta(z')=P_\beta(z'|z)P_\beta(z)$, would imply give equation (8); however, the opposite is not true. Equations (7) and (8) allow to describe the equilibrium expectation value of an observable O at $\beta$ in terms of another distribution $P_{\beta'}(z)$ at a different temperature $\beta'$:

$$\langle O \rangle_\beta = \sum_{z,z'} O(z) w(z') P_\beta(z|z') P_{\beta'}(z') \qquad (9)$$

where $$w(z) = \frac{P_\beta(z)}{P_{\beta'}(z)} = \frac{Z_{\beta'}}{Z_\beta} e^{-(\beta-\beta')E(z)} \qquad (10)$$

Is a weight assigned to the state z'. If the new temperature is larger ($\beta'>\beta$), then $P_{\beta'}$ is an easier distribution to construct. It is therefore possible to use a simpler distribution to generate statistics from a harder distribution.

The above sum (9) can be approximated by weighted sampling as follows:

$$\langle O \rangle_\beta = \mathbb{E}_{z,z'}[O(z)w(z')] \qquad (11)$$

Where $\mathbb{E}_{z,z'}$ is an expectation value estimated using sample z and z'.

Sampling can be performed as follows: for the $k^{th}$ sample, generate the first state z' by sampling from the distribution $P_{\beta'}$, generate the second state z using a MCMC at temperature $\beta$ starting from state z', and weight the sample by:

$$w_k = \frac{Z_{\beta'}}{Z_\beta} e^{-(\beta-\beta')E(z)} \qquad (12)$$

The process can be repeated many times to generate a large number of samples, each weighted by a $w_k$. The pre-factor is the same in each case, so it can be eliminated by normalizing the weights.

Typically, in simulated annealing, the process starts at a high temperature, and gradually reduces the temperature, evolving the state using an MCMC, without introducing weights. If the goal is to obtain a true Boltzmann distribution at a low temperature, then the process should keep the system in equilibrium at intermediate temperatures. To do this, the process can apply many MCMC after each temperature change, and the process can be time-consuming.

By introducing weights, simulated annealing can anneal the system more quickly while producing the desired equilibrium statistics. The trade-off is that some samples can be lost because of the exponentially small weights accumulated during sampling.

Sampling from a Quantum Boltzmann Distribution

In one implementation of the present systems and methods, annealed importance sampling is used with quantum Monte Carlo simulation to generate samples from a quantum Boltzmann distribution, i.e., a Boltzmann distribution of a quantum Hamiltonian.

Annealing can be performed by either changing the temperature or other Hamiltonian parameters such as the transverse field. The notation $\theta$ may be used to represent all such parameters, including temperature.

In quantum Monte Carlo (QMC) simulation, the quantum statistics are reproduced by Monte Carlo sampling from trajectories (paths) $x(\tau)$ along the imaginary time dimension $\tau \in [0,\beta]$. Each trajectory can appear in the sampling with probability $$P_\theta[x(\tau)] = \frac{e^{-s_\theta[x(\tau)]}}{Z_\theta} \qquad (13)$$

Monte Carlo updates change the trajectory $x \to x'$, which can be represented by a transition matrix $P_\theta[x(\tau)|x'(\tau)]$ that satisfied the stationary condition $$P_\theta[x(\tau)] = \int D[x'(\tau)] P_\theta[x(\tau)|x'(\tau)] P_\theta[x'(\tau)] \qquad (14)$$

Equation (13) and (14) can replace equations (7) and (8) as the basis for importance sampling. Equilibrium statistics can therefore the generated corresponding to a Hamiltonian H at the point $\theta$ using weighted equilibrium samples obtained at another point $\theta'$.

Quantum Annealing

Quantum annealing can be implemented in a physical quantum annealer such as an adiabatic quantum computer. In some implementations, the physical quantum annealer implements the following Hamiltonian:

$$H(s) = -A(s) \sum_i \sigma_i^x + B(s) \left[ \sum_i h_i \sigma_i^z + \sum_{i,j} J_{i,j} \sigma_i^z \sigma_j^z \right] \qquad (15)$$

where $h_i$ and $J_{i,j}$ are tuneable or programmable parameters, and $A(s)$ and $B(s)$ are monotonic functions of an annealing parameter s, where $0 \leq s \leq 1$, $A(0) \gg B(0) \approx 0$ and $B(1) \gg A(1) \approx 0$.

In some implementations, the annealing parameters is varied linearly with time t: $s(t)=t/t_a$, where $t_a$ is the annealing time. Alternatively, or in addition, the annealing parameter s may be varied non-linearly with time.

For an infinitely slow evolution, a quantum annealer will follow equilibrium distribution of its instantaneous Hamiltonian H(s). However, in many applications, a system comprising a quantum annealer will evolve close to equilibrium up to some point and then gradually deviate from equilibrium distribution. This can present challenges in certain applications. For example, if one wishes to sample from a Boltzmann distribution, this de-equilibration can lead to a final distribution that is not exactly a Boltzmann distribution. A Boltzmann distribution may be obtained, for example, by reading out the state of a quantum annealer at an intermediate point during the anneal, before the deviation starts.

Re-Equilibrated Quantum Sampling

In some implementations, the physical quantum annealer performs a re-equilibration act. This may be in response to an act which pushes the state of the annealer away from equilibrium, and/or as a countermeasure to the gradual deviation from equilibrium described above.

In some implementations, the physical quantum annealer may de-equilibrate by executing a fast ramp operation (a steep linear variation of the annealing parameter s) from an intermediate point part way through annealing to the end of the annealing:

$$s(t) = s^* + \frac{(t-t_1) \times (1-s^*)}{(t_a - t_1)} \quad (16)$$

where $t_1$ is the start of the ramp, and $s^*$ is the annealing parameter at an intermediate point during the anneal.

Examples of fast ramp operations, including reverse annealing to an intermediate value of s, are found in International Patent Application No. US2016/059,169 and U.S. Provisional Application No. 62/417,940.

The ramp can be selected to be faster than the relaxations of the system, while not so fast as to cause non-adiabatic transitions to higher energy states. At least some distortion caused by non-adiabaticity can be recovered by a sufficiently quick thermalization step, provided the ramp is slow compared to the time scale determined by the temperature. A suitable choice of ramp time $t_{ramp}$ is given by:

$$\beta h \lesssim t_{ramp} \lesssim t_{relax} \quad (17)$$

where $t_{relax}$ is the shortest relaxation time at intermediate point $s^*$.

The distribution obtained with a fast ramp operation from the equilibrium distribution $P_\theta(z)$ at point $\theta$ can be defined as:

$$\tilde{P}_\theta(\tilde{z}) = P_\theta(z) + \text{fast ramp} \quad (18)$$

As mentioned before, in general $\tilde{P}_\theta \neq P_\theta$ because of the non-equilibrium evolution during the fast ramp operation. In some cases, where $t_{ramp}$ is smaller than all the relaxation times at point $s^*$, the difference between the distributions may be negligible and $\tilde{P}_\theta$ may be used to represent an equilibrium distribution with some confidence. In other cases, however $t_{ramp}$ may be larger than some local relaxations, for example relaxations that flip only one or two qubits in the quantum processor. In such case, it may be possible to recover the equilibrium distribution with post-processing.

A method for using a quantum processor with fast ramp may be summarized by a transition matrix $P_\theta^{QA}(\tilde{z}, \tilde{z}')$ as follows:

$$P_\theta^{QA}(\tilde{z}, \tilde{z}') = \begin{cases} 1. \text{ initialize qubits in state } \tilde{z}' \\ 2. \text{ reverse anneal to } s* \text{ within } t_{ramp} \\ 3. \text{ hold at } s* \text{ for time } t_{hold} \\ 4. \text{ ramp to } s=1 \text{ within } t_{ramp} \\ 5. \text{ measure the state } \tilde{z}' \end{cases} \quad (19)$$

Equation (19) will be described in FIG. 2.

Figure 2:
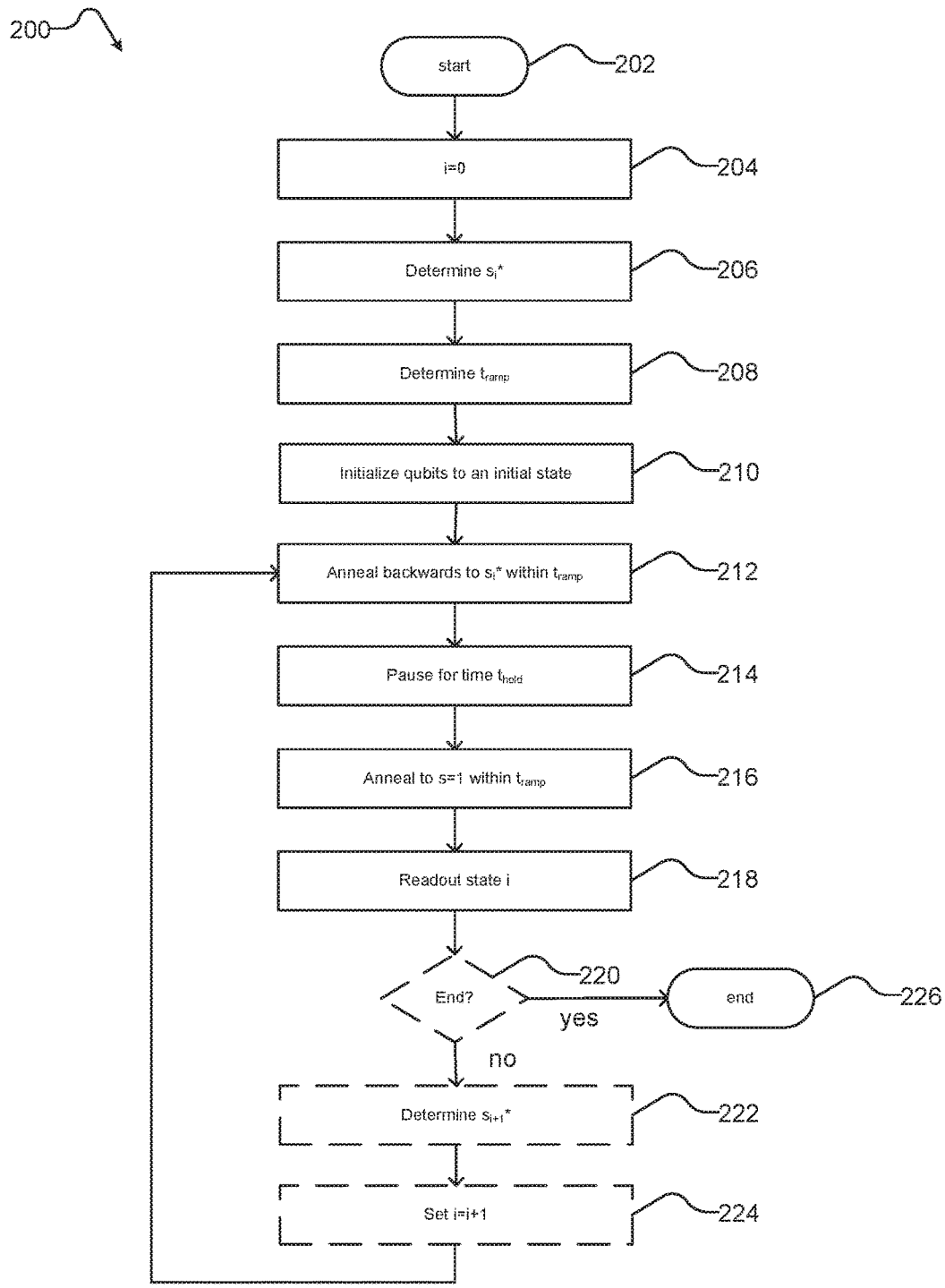
FIG. 2 is a flow diagram of an exemplary method of operation of a hybrid computing system to generate statistics.

FIG. 2 is a flow chart illustrating a method 200 for operating a hybrid computing system including at least one digital processor and at least one analog processor with a fast ramp operation and a reverse annealing operation for generating equilibrium statistics. The analog processor may be a quantum annealing processor.

Method 200 comprises acts 202 through 226. For method 200, as with others methods taught herein, the various acts may be performed in a different order than that illustrated and described. Additionally, the methods can omit some acts, and/or employ additional acts. One or more of these acts may be performed by or via one or more circuits, for instance one or more processors (e.g., digital processors such as microprocessors, analog processor such as quantum processors, a hybrid computer including a digital process and an analog processor). A sampling device, such as, a device including a hybrid computer, may perform one or more of the acts in method 200.

Method 200 starts at 202, for example in response to another routine.

At 204 the at least one digital processor initializes a counter i to a starting value, e.g., i=0.

At 206, the at least one digital processor determines an intermediate value $s^*$ of the annealing parameter s. The intermediate value $s_i^*$ may be supplied to the at least one digital processor as part of a set of input or determined by the at least one digital processor.

At 208, the at least one digital processor determines a time interval $t_{ramp}$. The value of $t_{ramp}$ may be supplied to the at least one digital processor as part of a set of input or determined by the at least one digital processor. $t_{ramp}$ is chosen so as to satisfy equation (17).

At 210, the at least digital processor programs the at least one analog processor so that at least a portion of the qubits in the at least one analog processor is in an initial state z at an initial time corresponding to counter i. The initial state z may be an equilibrium state corresponding to a distribution $P_\theta(z)$. In one implementation, distribution $P_\theta(z)$ is a Boltzmann distribution. The at least one analog processor may be programmed so that after an annealing operation the samples obtained corresponds to samples from distribution $P_\theta(z)$.

From 212 to 222, method 200 iterates over linear increments of counter i.

Figure 5A:
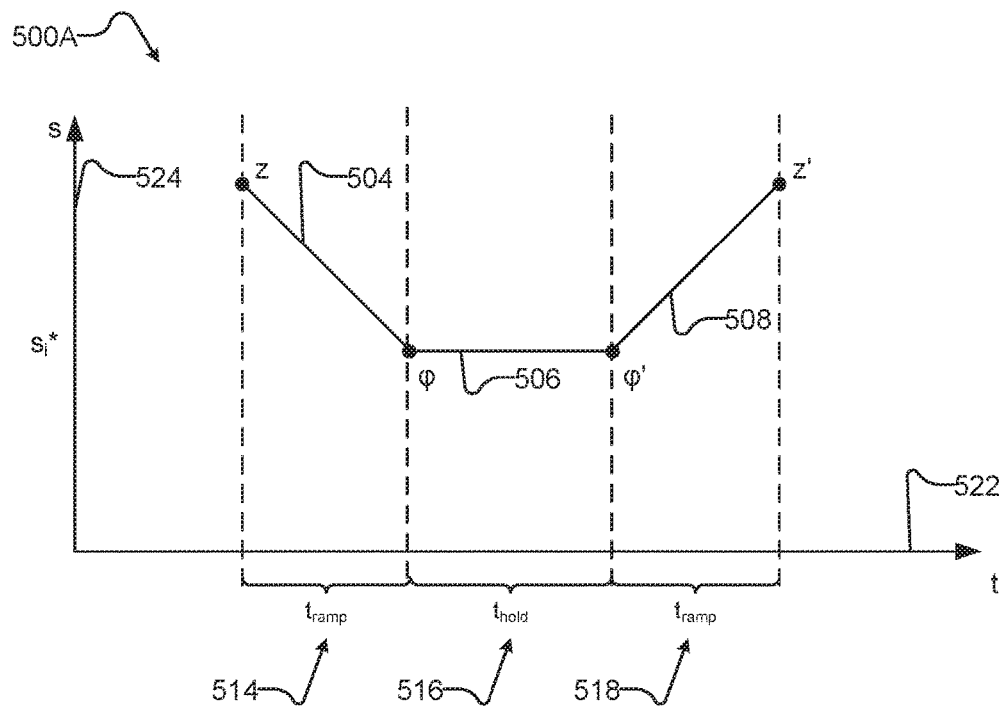
FIG. 5A is a chart showing an exemplary set of evolutions performed during an example implementation of the method of FIG. 2.

At 212, the at least one digital processor programs the at least one analog processor so that the at least analog processor evolves from a value s=1 to a value $s_i^*$ of the annealing parameter s within a time $t_{ramp}$, where $s_i^*$ and $t_{ramp}$ where determined at 206 and 208, respectively. FIG. 5A shows an exemplary graph 500A illustrating this evolution as line 504 occurring over time interval $t_{ramp}$. (Axes 522 and 524 correspond to time t and annealing parameter s, respectively).

At 214, the at least one digital processor clamps the state of the at least one analog processor for a time $t_{hold}$. As mentioned before, the time $t_{hold}$ should be long enough for the system to re-equilibrate and recover from any distortion that may have caused the state of the at least one analog processor to deviate from equilibrium. A distortion may be caused by the fast ramp operation at 212. The time $t_{hold}$ may be determined by the at least digital processor at 214 or supplied to the at least one digital processor as part of a set of inputs. An example of this clamping is shown as line 506 occurring over time interval $t_{hold}$ in FIG. 5A.

At 216, the at least one digital processor programs the at least one analog processor so that the at least one analog processor evolves from $s_i^*$ to s=1 in time $t_{ramp}$. The time $t_{ramp}$ may be the same time interval applied at 212 or different (e.g., a longer time interval), but still satisfying condition (17). An example of this evolution is shown as line 508 occurring over time interval $t_{ramp}$ in FIG. 5A.

At 218, while the at least analog processor is in a classical state, the at least one digital processor reads out the state of the at least one analog processor. The state read out at 218 is sampled from the same distribution $P_\theta(z)$.

Quantum Importance Sampling

Annealed importance sampling (AIS) cannot be easily directly applied to a quantum annealing system because in order to calculate the weights, the energy of the system needs to be measured, but in a quantum annealing system measurements are commonly done in a computation basis, not an energy basis. In addition, a measurement of the state of a quantum annealer, when the quantum annealer is in a quantum state, will destroy the quantum state of the system, so that the state read is a classical state, which is not desirable in annealed importance sampling.

The below method can be applied with a quantum processor and quantum Monte Carlo simulation for obtaining weighted samples from an equilibrium distribution.

Optionally, at 220, the at least one digital processor determines whether an exit condition has been met. In one implementation the exit condition may be the completion of a predetermined numbers of iterations, while in other implementations, the exit conditions may be the measure of a performance factor reaching a pre-determined threshold. If the exit condition is not met at 220, control passes to 222, otherwise to 226. In some implementations, the method proceeds to end at 226 without performing a determination of an exit condition.

At 222, the at least one digital processor determines a new intermediate value $s_{i+1}^*$ for the annealing parameter s, where $s_{i+1}^* > s_i^*$.

At 224, the at least one digital processor increases the value of the counter i to i=i+1, before passing control to 212.

At 226, method 200 terminates, until for example it is invoked again.

At each iteration of method 200 the at least one analog processor starts a new evolution cycle from an equilibrium state determined at the previous iteration. That is, when the at least one analog processor recovers from any distortion, if the initial state $\tilde{z}'$ is sampled from $\tilde{P}_\theta(\tilde{z}')$, the state read out at 218 will also be sampled from the same distribution, so that $$\tilde{P}_\theta(\tilde{z}) = \sum_{\tilde{z}'} P_\theta^{QA}(\tilde{z}|\tilde{z}')\tilde{P}_\theta(\tilde{z}') \tag{20}$$

Equation (20) may be used instead of (8) for importance sampling. However, $\tilde{P}_\theta(\tilde{z})$ has no closed form that can be used as an equivalent of equation (7), preventing a direct application of annealed importance sampling via method 200.

Quantum Importance Sampling with Quantum Monte Carlo Post-Processed Samples

The distribution obtained after a fast ramp from an equilibrium distribution may deviate locally from the desired Boltzmann distribution. In one implementation, the system uses quantum Monte Carlo (QMC) post-processing to recover the desired distribution.

As mentioned before, for small enough $t_{ramp}$ deviation of $\tilde{P}_\theta$ from $P_\theta$ is local, i.e. it involves only short hamming distance relaxations. Therefore, it may be possible to recover, or approximate with a degree of certainty, $P_\theta$ with QMC post-processing.

After an annealing operation, the read-out state $\tilde{z}$ is post-processed to obtain a state z, for example with quantum Monte Carlo post-processing. The post-processing operation can be defined by the probability distribution $P_\theta^{QMC}(z|\tilde{z})$, which is the probability distribution of a state z obtained after a few passes of QMC simulation with parameter $\theta$, staring from state $\tilde{z}$.

$P_\theta^{QA}(\tilde{z},\tilde{z}')$ as defined in (19) can be used with $P_\theta^{QMC}(z|\tilde{z})$ as a hybrid operation $P_\theta^{HYB}$ which take an initial state z' to generate $\tilde{z}$, then runs a few iterations of quantum Monte Carlo simulation at parameter $\theta$ to generate state z:

$$P_\theta^{HYB}(z|z') = \sum_{\tilde{z}} P_\theta^{QMC}(z|\tilde{z})P_\theta^{QA}(\tilde{z}|z') \tag{21}$$

Post-processing, for example QMC post-processing, may restore equilibrium from local deviations due to a fast ramp operation. Thus, starting from an equilibrium state it is possible to get back to an equilibrium state:

$$P_\theta(z) = \sum_{z'} P_\theta^{HYB}(z|z')P_\theta(z') \tag{22}$$

Similar to (10), importance weights can be defined as $$w(z) = \frac{P_\theta(z)}{P_{\theta'}(z)} \tag{23}$$

To estimate weights (23) it is possible to define a dimensionless local free-energy $\mathcal{F}_\theta(z)$ as a quantum analog to the local (free) energy to be used to calculate the weights:

$$w(z) \approx \mathcal{N} e^{\mathcal{F}_{\theta'}(z) - \mathcal{F}_\theta(z)}(z) \tag{24}$$

Where $\mathcal{N}$ is a normalization factor, and only local equilibrations of QMC are needed to calculate $\mathcal{F}_\theta$.

The above method can be generalized by taking multiple samples $z_1, \ldots, z_n$ with a quantum annealing processor and a digital processor, where each sample, $z_i$, is obtained from $z_{i-1}$ using $P_\theta^{HYB}(z|z')$ as defined in (21), then calculating normalized importance weights:

$$w(z_1, \ldots, z_{n-1}) = \mathcal{N} e^{-\sum_{m=1}^{n-1}[\mathcal{F}_{\theta_{m+1}}(z_m) - \mathcal{F}_{\theta_m}(z_m)]} \tag{25}$$

Figure 3:
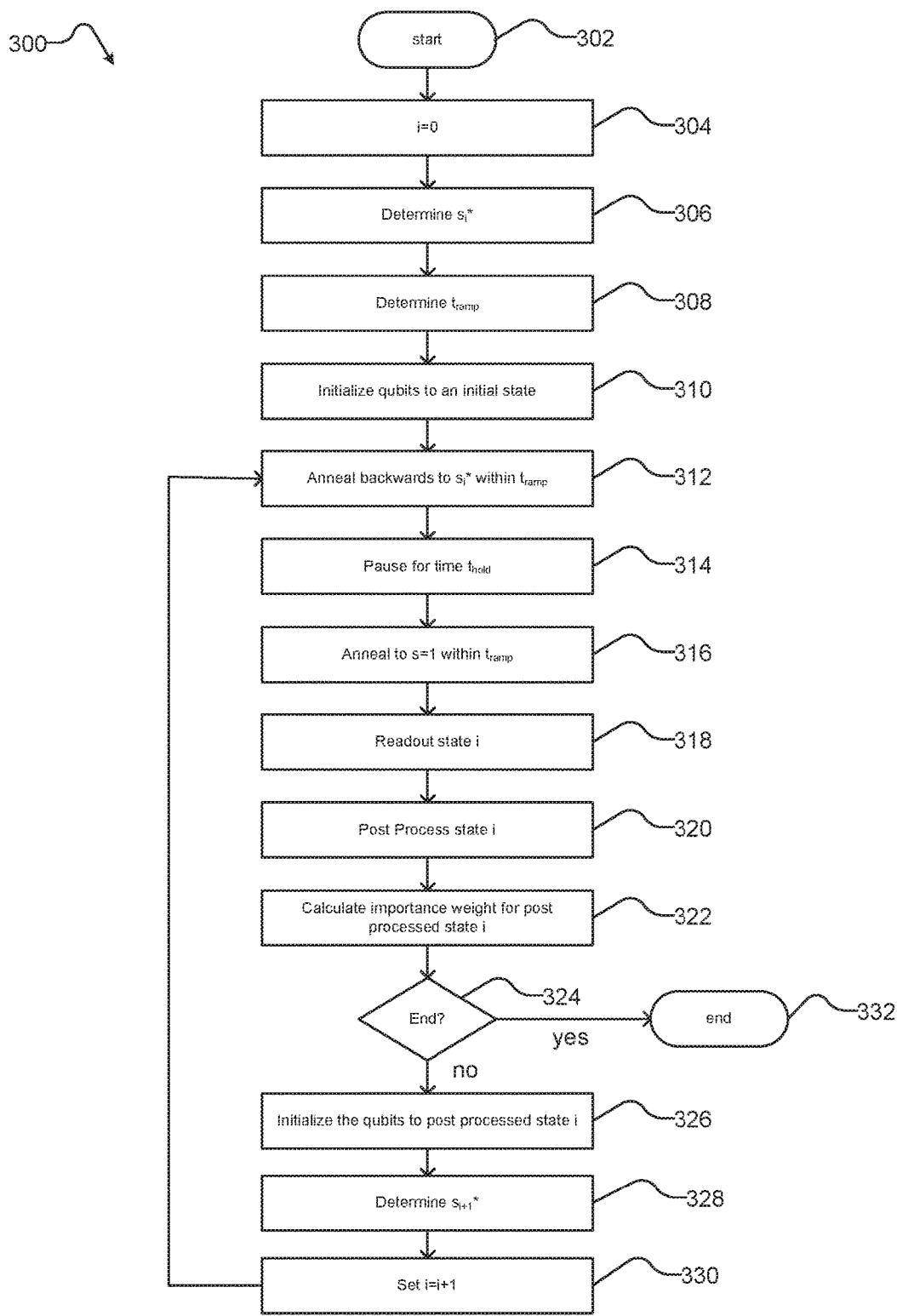
FIG. 3 is a flow diagram of an exemplary method of operation of a hybrid computing system to generate equilibrium statistics via post processing and calculating importance weights.

FIG. 3 is a flow diagram of an exemplary method 300 of operation of a hybrid computing system comprising at least one digital processor and at least one analog processor to generate equilibrium statistics via post processing and calculating importance weights. The analog processor may be a quantum annealing processor.

Method 300 comprises acts 302 through 332. For method 300, as with others methods taught herein, the various acts may be performed in a different order than that illustrated and described. Additionally, the methods can omit some acts, and/or employ additional acts. One or more of these acts may be performed by or via one or more circuits, for instance one or more processors (e.g., digital processors such as microprocessors, analog processor such as quantum processors, a hybrid computer including a digital process and an analog processor). A sampling device, such as, a device including a hybrid computer, may perform one or more of the acts in method 300.

Method 300 starts at 302, for example is response to a call from another routine.

At 304, the at least one digital processor initializes a counter i to a starting value, e.g., i=0.

At 306, the at least one digital processor determines an intermediate value $s_i^*$ of the annealing parameter s. The intermediate value $s_i^*$ may be supplied to the at least one digital processor as part of a set of input or determined by the at least one digital processor.

At 308, the at least one digital processor determines a time interval $t_{ramp}$. The value of $t_{ramp}$ may be supplied to the at least one digital processor as part of a set of input or determined by the at least one digital processor. $t_{ramp}$ is chosen so as to satisfy equation (17).

At 310, the at least digital processor programs the at least one analog processor so that at least a portion of the qubits in the at least one analog processor is in an initial state at an initial time corresponding to counter i. The initial state is an equilibrium state corresponding to a distribution $P_\theta(z)$. In one implementation, distribution $P_\theta(z)$ is a Boltzmann distribution.

From 312 to 328, method 300 iterates over linear increments of counter i.

At 312, the at least one digital processor programs the at least one analog processor so that the at least analog processor evolves from a value s=1 to a value $s_i^*$ of the annealing parameter s within a time $t_{ramp}$, where $s_i^*$ and $t_{ramp}$ where determined at 306 and 308, respectively.

At 314, the at least one digital processor clamps the state of the at least one analog processor for a time $t_{hold}$. As mentioned before, the time $t_{hold}$ should be long enough for the system to re-equilibrate and recover from any distortion that may have caused the state of the at least one analog processor to deviate from equilibrium. A distortion may be caused by the fast ramp operation at 312. The time $t_{hold}$ may be determined by the at least digital processor at 314 or supplied to the at least one digital processor as part of a set of inputs.

At 316, the at least one digital processor programs the at least one analog processor so that the at least one analog processor evolves from $s_i^*$ to s=1 in time $t_{ramp}$. The time $t_{ramp}$ may be the same time interval applied at 312 or different, but still satisfying condition (17).

At 318, while the at least analog processor is in a classical state, the at least one digital processor reads out the state of the at least one analog processor. The state of at least a portion of the qubits in the at least one analog processor may be not corresponding to the initial distribution $P_\theta$; at least a portion of the qubits in the at least one analog processor may be in a state $\tilde{z}$ corresponding to a distribution $\tilde{P}_\theta$ that is a deviation from the initial distribution $P_\theta$.

At 320, the at least one digital processor performs post-processing on the state $\tilde{z}$ read out at 318. As mentioned before, in some implementations (e.g., small $t_{ramp}$), it is possible to recover the initial distribution $P_\theta$ from the distribution $\tilde{P}_\theta$ measured at 318, therefore the state z can be recovered from $\tilde{z}$. In at least one implementation, the at least one digital processor performs QMC post-processing.

At 322, the at least one digital processor calculates importance weights using equation (25).

At 324, the at least one digital processor determines whether an exit condition has been met, as described with reference to 220 of method 200. If the exit condition is not met, control passes to 326, otherwise to 332.

At 326, the at least one digital processor programs the at least one analog processor so that at least a portion of the qubits in the at least one analog processor is in state z, obtained at after post-processing at 320.

At 328, the at least one digital processor determines a new intermediate value $s_{i+1}^*$ for the annealing parameter s, where $s_{i+1}^* > s_i^*$.

At 330, the at least one digital processor increases the value of the counter i to i=i+1, before passing control to 312.

At 332, method 300 terminates, until it is, for example, invoked again.

In method 300, all the samples are generated from post-processing, for example QMC post-processing. Therefore, every time the quantum annealing processor starts from a state $z_i$ that was the outcome of the last post-processing operation, its output $\tilde{z}_{i+1}$ will be post-processed to generate $z_{i+1}$. Method 300 may not be efficient in generating samples due to the need to reinitialize the parameters (e.g. qubits states) of the quantum annealing processor at each iteration.

Quantum Importance Sampling with Sequential Hardware Samples

In one implementation, the quantum annealer is initialized using its own previous state rather than a state generated by quantum Monte Carlo post-processing. One benefit of initializing the quantum annealer using its own previous state is that it can save hardware re-initialization time, and can increase the speed of quantum importance sampling.

Sequential operation can be described by the following:

$$\tilde{P}_\theta(\tilde{z}) \approx \sum_{\tilde{z}'} w(\tilde{z}') P_\theta^{QA}(\tilde{z} | \tilde{z}') \tilde{P}_{\theta'}(\tilde{z}') \qquad (26)$$

where the weights are given by:

$$w(\tilde{z}') = \sum_{z'} \frac{P_\theta(z')}{P_{\theta'}(z')} P_{\theta'}^{QMC}(z' | \tilde{z}') \qquad (27)$$

In implementations where θ is not very different from θ' and $t_{hold}$ is sufficiently long, the difference in output of $P\theta^{QA}$ when starting from z' or $\tilde{z}$' is negligible, i.e. $P_\theta^{QA}(\tilde{z}|z') \approx P_\theta^{QA}(\tilde{z}|\tilde{z}')$. The two distributions are not equal (z' is post-processed at θ' and $P_\theta^{QA}$ operates at θ), however, increasing $t_{hold}$ will reduce the error in the approximation.

In one implementation, statistical error in estimating the weights w($\tilde{z}$') can be reduced by generating many quantum Monte Carlo samples of z' for each $\tilde{z}$' generated by the quantum annealer at parameter θ'.

Using (26) eliminates the use of post-processing between successive runs of the quantum annealing operations, so that post-processing is only used for calculating the importance weights, which can be done at the end, after generating all the samples. During the quantum annealing operation, each output of the quantum annealing processor determines the initial state of the next $P_\theta^{QA}$ operations. Thus the quantum annealing processor is run in a sequential way each time starting with its own previous results without re-initialization.

Figure 4:
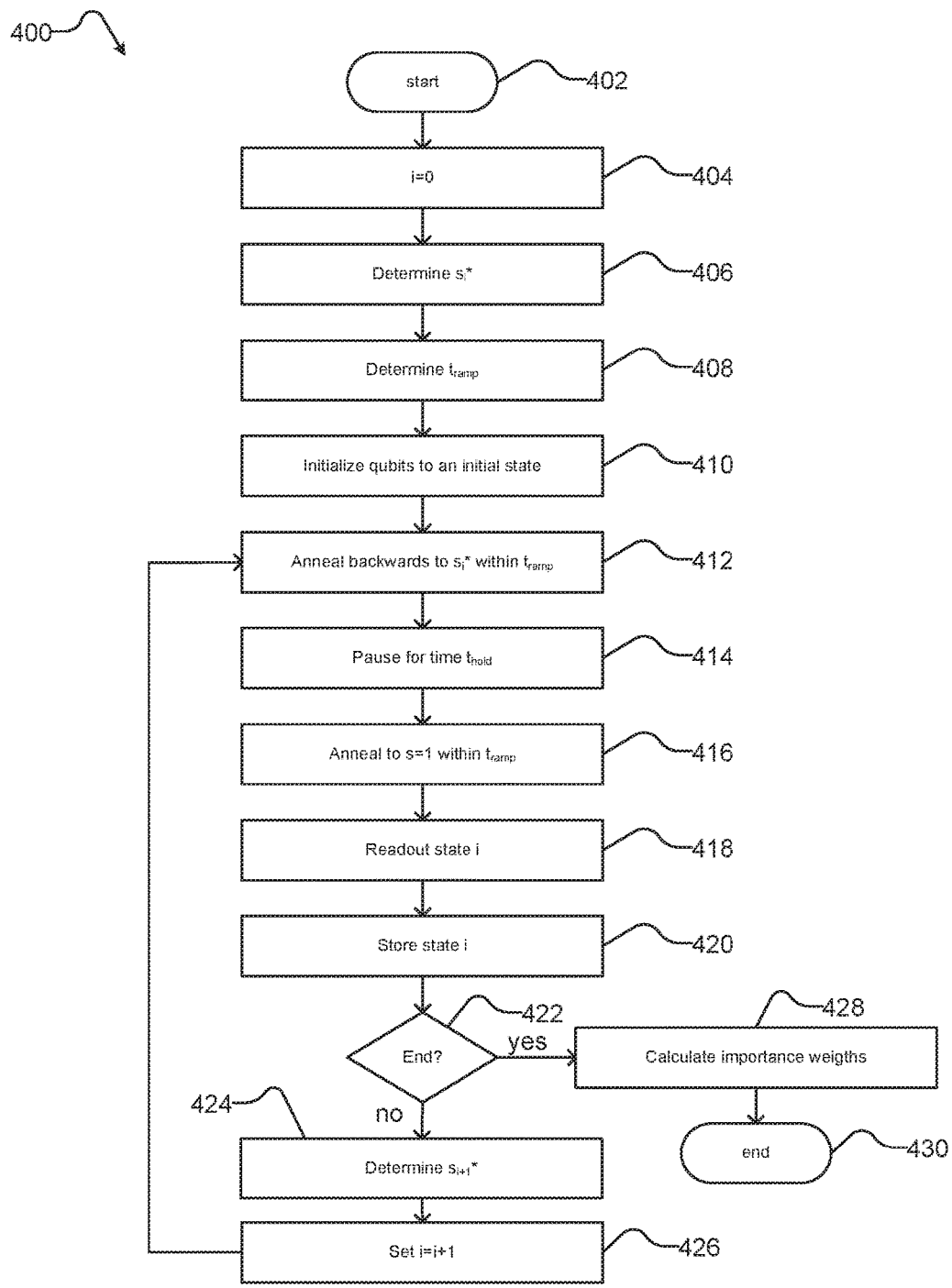
FIG. 4 is a flow diagram of an exemplary method of operation of a hybrid computing system to generate equilibrium statistics and calculating importance weights by sequential iteration of the analog processor.

FIG. 4 is a flow diagram of an exemplary method 400 of operation of a hybrid computing system comprising at least one digital processor and at least one analog processor to generate equilibrium statistics and calculating importance weights by sequential iteration of the analog processor. The analog processor may be a quantum annealing processor.

Method 400 comprises acts 402 through 430. For method 400, as with others methods taught herein, the various acts may be performed in a different order than that illustrated and described. Additionally, the methods can omit some acts, and/or employ additional acts. One or more of these acts may be performed by or via one or more circuits, for instance one or more processors (e.g., digital processors such as microprocessors, analog processor such as quantum processors, a hybrid computer including a digital process and an analog processor). A sampling device, such as, a device including a hybrid computer, may perform one or more of the acts in method 400.

Method 400 start at 402, for example is response to a call from another routine.

At 404, the at least one digital processor initializes a counter i to a starting value, e.g., i=0.

At 406, the at least one digital processor determines an intermediate value $s_i^*$ of the annealing parameter s, as described with reference to 306 of method 300.

At 408, the at least one digital processor determines a time interval $t_{ramp}$, as described with reference to 308 of method 300.

At 410, the at least digital processor programs the at least one analog processor so that at least a portion of the qubits in the at least one analog processor is in an initial state at an initial time corresponding to counter I, as described with reference to 310 of method 300.

From 412 to 424, method 400 iterates over linear increments of counter i.

At 412, the at least one digital processor programs the at least one analog processor so that the at least analog processor evolves from a value s=1 to a value $s_i^*$ of the annealing parameter s within a time $t_{ramp}$, where $s_i^*$ and $t_{ramp}$ where determined at 406 and 408, respectively.

At 414, the at least one digital processor clamps the state of the at least one analog processor for a time $t_{hold}$, as described with reference to 314 of method 300.

At 416, the at least one digital processor programs the at least one analog processor so that the at least one analog processor evolves from $s_i^*$ to s=1 in time $t_{ramp}$, as described with reference to 316 of method 300.

At 418, while the at least analog processor is in a classical state, the at least one digital processor reads out the state of the at least one analog processor, as described with reference to 318 of method 300.

At 420, the at least one digital processor stores the state of the at least one analog processor. The at least one digital processor may employ a memory storage system as described in FIG. 1.

At 422, the at least one digital processor determines whether an exit condition has been met, as described with reference to 220 of method 200. If the exit condition is not met, control passes to 424, otherwise to 428.

At 424, the at least one digital processor determines a new intermediate value $s_{i+1}^*$ for the annealing parameter s, where $s_{i+1}^* > s_i^*$.

At 426, the at least one digital processor increases the value of the counter i to i=i+1, before passing control to 412.

At 428, the at least one digital processor calculates importance weights based on equation (27) using the values stored at 420.

At 430, method 400 terminates, until it is, for example, invoked again.

Quantum Update Operator

The efficiency of Markov Chain Monte Carlo (MCMC) methods tends to be limited by the update operation used. For instance, update operations such as Metropolis-Hastings or Gibbs sampling tend to be highly local, which may impede exploration of the state space and thus reduce the quality of samples. Some MCMC methods attempt to mitigate this locality effect (e.g. as in parallel tempering), but the efficiency of such methods still tends to be strongly dependent on the power of the update operator.

In some implementations, a re-equilibration by a physical quantum annealer is used to provide a broad-scale update operator in an MCMC method sampling from classical and/or quantum Boltzmann distributions. The re-equilibration comprises an operation of the physical quantum annealer which uses thermal and/or quantum effects to evolve (or at least tend to evolve) the state of the physical quantum annealer towards equilibrium. This operation may be considered to be an update operation and may be denoted $U_{RE}: \Psi \to \Psi$, where $\Psi$ is the space of all quantum states representable by the physical quantum annealer. Thus, $\psi' = U_{RE} \psi$ denotes the quantum state $\psi$ being transformed to updated quantum state $\psi'$ according to operator $U_{RE}$. Further operators introduced herein use similar notation.

In some implementations the re-equilibration operation $U_{RE}$ comprises holding the parameters of a physical quantum annealer at a particular point in the anneal s* for time $t_{hold}$, during which time the quantum and/or thermal dynamics of the system will tend to evolve the quantum state toward an equilibrium quantum Boltzmann distribution with parameters A(s), B(s), and temperature T (corresponding to the physical temperature of the physical quantum annealer). This operation may be denoted by the operator $U_{s^* \to s^*}^{PQA}(t_{hold}): \Psi \to \Psi$.

The re-equilibrating behavior of $U_{s^* \to s^*}^{PQA}(t_{hold})$ may be at least partially explained by the observation that open quantum systems have a state described by a density matrix ρ(t) and, in a Markovian environment in particular, this state evolves with time according to:

$$\dot{\rho}(t) = \mathcal{L}(t) * \rho(t) \qquad (28)$$

where $\mathcal{L}$ is a superoperator in the Hilbert space of the density matrices. $\mathcal{L}$ satisfies the detailed balance condition, which results in the behavior of $U_{s^* \to s^*}^{PQA}(t_{hold})$ described above.

One may extend $U_{RE}$ (e.g. $U_{s^* \to s^*}^{PQA}(t_{hold})$) by composing it with other operators without sacrificing the equilibration dynamics described above, so long as those compositions satisfy detailed balance conditions. For instance, in some implementations, $U_{RE}$ is composed with an invertible operation $U_I$ to generate a composed update operation $U_c = U_I^{-1} U_{RE} U_I$. This pattern of composition may be repeated with further invertible operations. Note that, since MCMC methods and quantum annealing are probabilistic methods, invertible operation $U_I$ may be invertible in a probabilistic sense but not necessarily invertible in an exact sense (i.e. $U_I^{-1} U_I$ will not necessarily yield an identity output for every input).

In some implementations, the physical quantum annealer is initialized in a classical state z corresponding to s=1, evolved to a quantum state $\psi$, clamped for a period of time $t_{hold}$ yielding a re-equilibrated quantum state $\psi'$, and then annealed to a classical state z' corresponding to s=1. The resulting classical state z' may be considered to be a re-equilibrated update to classical state z. An example method implementing such a process is shown in FIG. 2 and illustrated by FIG. 5A, both of which are described above.

This may be more formally expressed by denoting the evolution from s=1 to s=s* over time $t_{ramp}$ as $U_{1 \to s^*}^{PQA}(t_{ramp}): Z \to \Psi$ and denoting the evolution from s=s* to s=1 over time $t_{ramp}$ as $U_{s^* \to 1}^{PQA}(t_{ramp}): \Psi \to Z$, where Z is the space of classical states. These operations are inverses of each other and, in essence, allow for the conversion of classical states to quantum states and vice-versa. Accordingly, the re-equilibration operator $U_{s^* \to s^*}^{PQA}(t_{hold})$ may be extended from the quantum space to the classical space by performing the following operation:

$$z' = U_{1 \to s^*}^{PQA}(t_{ramp}) U_{s^* \to s^*}^{PQA}(t_{hold}) U_{s^* \to 1}^{PQA}(t_{ramp}) z \qquad (29)$$

The above operation may be further extended to accommodate classically-implemented MCMC annealing methods where the state that must be updated is a classically-represented intermediate state x corresponding to a point s=s* in the evolution of the MCMC method. Although such a state x may notionally correspond to a quantum state, it may not necessarily be directly representable on the physical quantum annealer (e.g. because the physical quantum annealer cannot be initialized in a quantum state, because the state x comprises some internal representation specific to the MCMC method, and/or for other reasons).

In some implementations, the intermediate state x is converted to a classical state z via a classical update operation $U_{s^*\to 1}^{MCMC}:X\to Z$, updated to an updated classical state z' by applying a suitable update operation (e.g. the operation described in equation (29)), and then converted to an updated intermediate state x' via an inverse classical update operation $U_{1\to s^*}^{MCMC}:Z\to X$, where X is the space of intermediate states representable by the MCMC method. This yields the following update operation:

$$x' = U_{1\to s^*}^{MCMC} U_{s^*\to 1}^{PQA}(t_{ramp}) U_{s^*\to s^*}^{PQA}(t_{hold}) U_{1\to s^*}^{PQA}(t_{ramp}) U_{s^*\to 1}^{MCMC} x \qquad (30)$$

As described above, this operation preserves detailed balance conditions and so may be used as an update operation for at least some classical MCMC methods, including those directed to sampling from a Boltzmann distribution.

In some implementations, $U_{s^*\to 1}^{MCMC}:X\to Z$ comprises annealing quickly to the end of the evolution using classical updates (e.g. Metropolis-Hastings, Gibbs sampling, or other classical updates employed by the relevant MCMC method). The specific speed meant by "quickly" will tend to vary between MCMC methods, update operations, and intermediate states s*, but will generally be faster than the ordinary annealing rate of the method. Preferably, the annealing rate is selected to be sufficiently fast to limit changes introduced over the course of an operation $z=U_{s^*\to 1}^{MCMC} x$ to local changes. Similarly, the operator $U_{1\to s^*}^{MCMC}$ may comprise reverse annealing quickly back to point s*, although in some embodiments the annealing rate of $U_{1\to s^*}^{MCMC}$ is slower than the annealing rate of $U_{s^*\to 1}^{MCMC}$ to provide a greater opportunity for $U_{1\to s^*}^{MCMC}$ to invert changes introduced by $U_{s^*\to 1}^{MCMC}$. The annealing rate and other characteristics of operation $U_{s^*\to 1}^{MCMC}$ and $U_{1\to s^*}^{MCMC}$ may be pre-selected, provided by a user, and/or otherwise obtained. Accelerating the annealing rate may involve, for example, relaxing one or more proposal acceptance criteria.

In some implementations, update operation $U_{s^*\to 1}^{MCMC}:X\to Z$ comprises finding a projection from an intermediate state x to a classical state z without necessarily annealing. For example, in an example MCMC method simulating quantum annealing an intermediate state x may comprise a set of i spins $\{s_q^i\}$ for each simulated qubit q. A projection may be determined by randomly selecting, for each simulated qubit, one of its associated spins in state x. That is, $U_{s^*\to 1}^{MCMC}:X\to Z$ may be implemented according to:

$$z = U_{1\to s^*}^{MCMC} x = \{s_q^j | j=\text{random}\{1, \ldots, i\}, \forall q\} \qquad (31)$$

In some implementations, X is a higher-dimensional space than Z, so the inverse operation $U_{1\to s^*}^{MCMC}:Z\to X$ may comprise a non-projection operation which maps from Z to X and inverts the operation of $U_{s^*\to 1}^{MCMC}:X\to Z$. For example, in the example MCMC method described above, $U_{1\to s^*}^{MCMC}:Z\to X$ may comprise generating an initial intermediate state $x_i'$ where each spin $s_q^i$ for a simulated qubit q is set based on the corresponding classical value $s_q$ for that qubit in classical state z'. $U_{1\to s^*}^{MCMC}:Z\to X$ may further comprise generating an output intermediate state $x_i$ by reverse-annealing from $x_i'$ as described above. This further reverse annealing step, although not necessarily required, is likely to improve the performance of the MCMC method, since the example initial intermediate state $x_i'$ is relatively homogenous.

In addition, or alternatively, operations $U_{s^*\to 1}^{MCMC}:X\to Z$ and/or $U_{1\to s^*}^{MCMC}:Z\to X$ may comprise any other suitable operation for converting an intermediate state to a classical state.

Figure 5B:
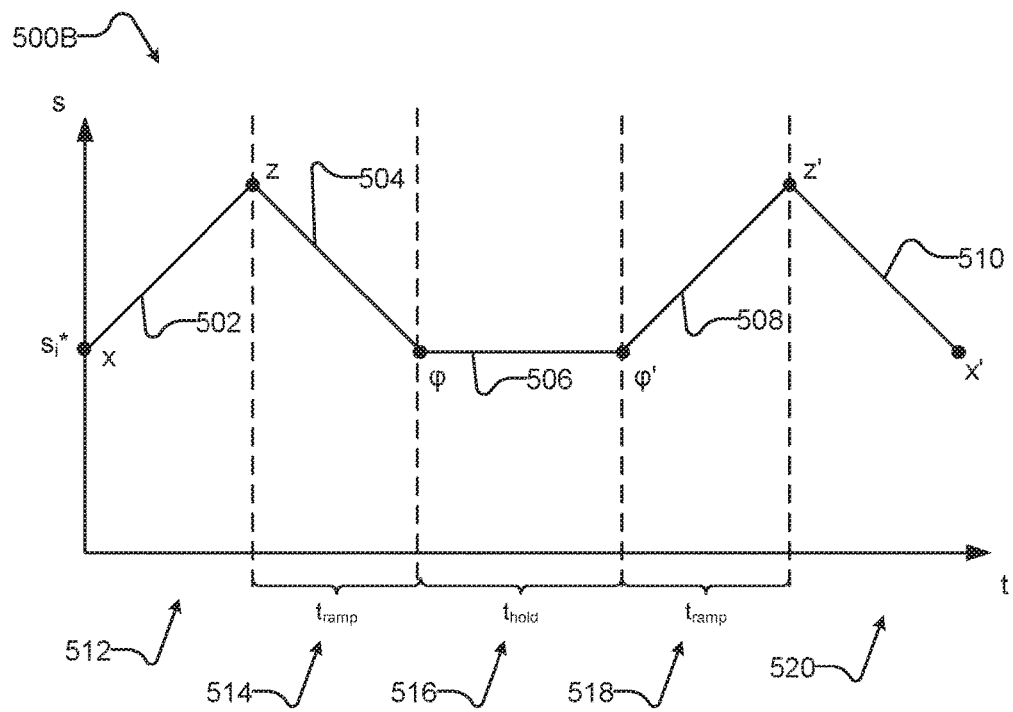
FIG. 5B is a chart showing an exemplary set of evolutions performed during an example implementation of the method of FIG. 6.

A chart 500B illustrating an example execution of the update operation of equation (30) is illustrated in FIG. 5B. Like-numbered elements of FIGS. 5A and 5B are similar and are described above with reference to FIG. 5A. Lines 502 and 510 correspond to evolutions according to operations $U_{s^*\to 1}^{MCMC}$ and $U_{1\to s^*}^{MCMC}$ over time periods 512 and 520, respectively. (For consistency with FIG. 5A, FIG. 5B refers to point $s_i*$ in the anneal, although this is simplified to s* in the following discussion for convenience). In some implementations, the evolutions of lines 502 and 510 are performed by a classical computer using a classical update operator associated with an MCMC method, as described above. The intervening evolutions of lines 504, 506, and 508 may be performed by a physical quantum annealer.

Figure 6:
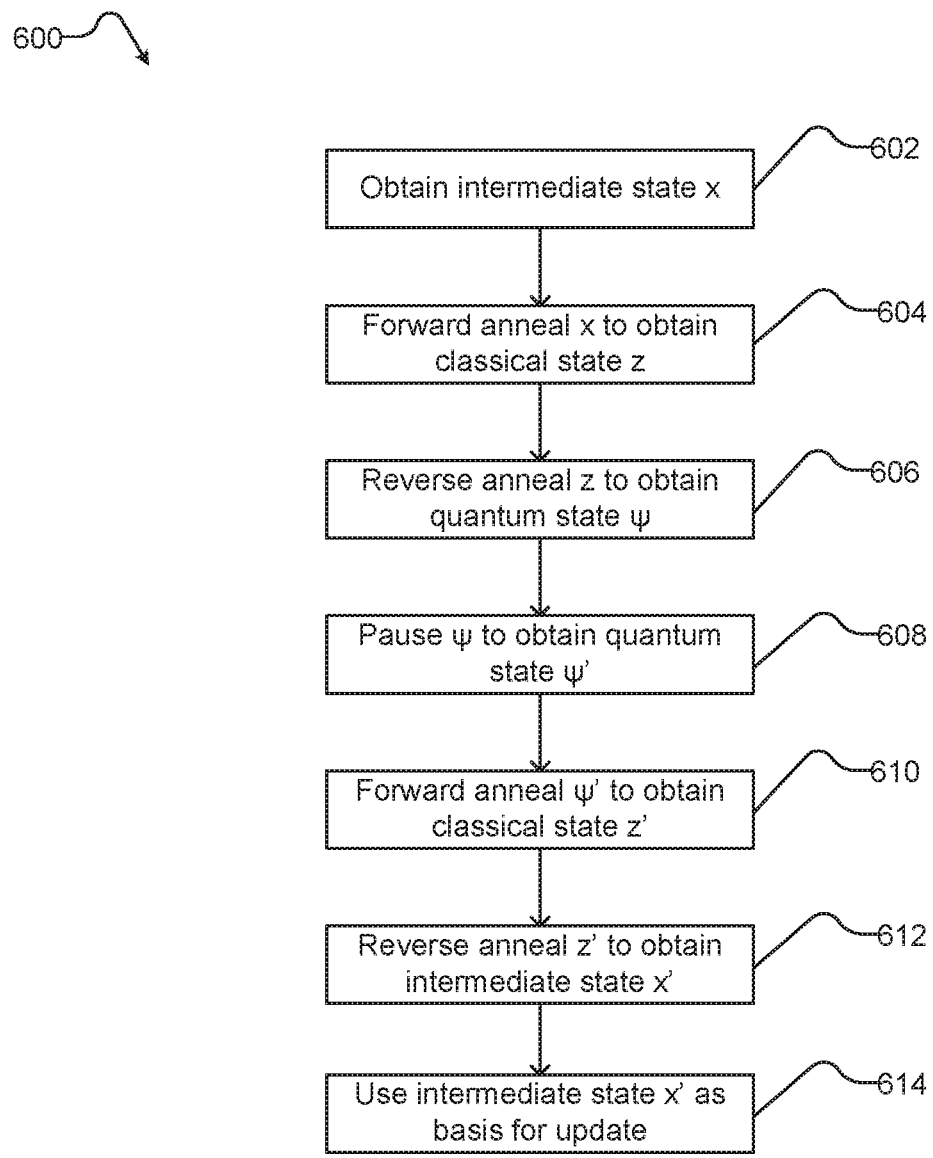
FIG. 6 is a flow diagram of an exemplary method of operation of a hybrid computing system to implement an update operation for a classical MCMC method using re-equilibration.

FIG. 6 shows a flowchart illustrating an example method 600 for implementing an update operation for a classical MCMC method using re-equilibration, for example via a physical quantum annealer. At 602, an intermediate state x is obtained. This may comprise, for example, receiving a communication containing intermediate state x from another computing system, determining intermediate state x in the course of executing an MCMC method, and/or otherwise receiving intermediate state x.

At 604, intermediate state x is converted to a classical state z. In some implementations, this comprises forward-annealing x from s=s* to s=1 to yield classical state z. As described above, this forward annealing may be done quickly so as to limit changes in global state introduced during annealing. The forward-annealing may be performed, for example, by a classical computer implementing the same or a similar method to the MCMC method which generated intermediate state x (subject to any changes to the method involved in accelerating the annealing rate). In some implementations, this conversion act comprises finding a projection of x to yield classical state z, as described above.

At 606, classical state z is reverse annealed (e.g. via a ramp operation over time $t_{ramp}$) from s=1 to s=s* in the evolution to yield quantum state ψ. This reverse annealing may be executed by a physical quantum annealer. For instance, classical state z may be read out from a classical processor, transmitted to a physical quantum annealer (e.g. a physical quantum annealer in a hybrid computer which also comprises the classical processor), and reverse-annealed by the physical quantum annealer.

At 608, the evolution of quantum state ψ is paused for a period of time (e.g. for a period $t_{hold}$), during which thermal and/or quantum effects may induce re-equilibration. This operation yields re-equilibrated quantum state ψ'. This re-equilibration may be executed by a physical quantum annealer. Note that quantum states ψ and ψ' are not necessarily observed or read out during the course of method 600, and are named merely for convenience of explanation.

At 610, re-equilibrated quantum state ψ' is forward-annealed (e.g. via a ramp operation over time $t_{ramp}$, which may be the same as or different than the time period of reverse-annealing act 606) s=s* to s=1. This operation yields re-equilibrated classical state z'. This forward annealing may be executed by a physical quantum annealer.

At 612, re-equilibrated classical state z' is reverse-annealed from s=1 to s=s* to yield re-equilibrated intermediate state x'. This reverse-annealing may be performed, for example, by a classical computer implementing the same or a similar method to the MCMC method of act 604 (subject to any changes involved in reversing the annealing and, optionally, using a different annealing rate). For instance, re-equilibrated classical state z' may be read out from the physical quantum annealer, transmitted to a classical processor (e.g. a classical processor in a hybrid computer which also comprises the physical quantum annealer), and reverse-annealed by the classical processor.

At 614, re-equilibrated classical state x' is used as a basis for an update proposal for the MCMC method which generated intermediate state x. For instance, the MCMC method may use re-equilibrated intermediate state x' as an update proposal with or without further post-processing and/or other modification. The resulting update proposal may be accepted or rejected according to the criteria of MCMC method.

The above method provides an exemplary implementation of a quantum update operator for a classical MCMC method and illustrates a use of physical quantum annealers to refine classical methods.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet including U.S. Patent Publication No. US20150161524, U.S. Patent Publication No. US20150269124, International Patent Application No. US2016/059,169, U.S. Provisional Application No. 62/445,496, U.S. Provisional Application No. 62/447,904, and U.S. Provisional Application No. 62/417,940 are incorporated herein by reference, in their entirety. Aspects of the embodiments can be modified, if necessary, to employ systems, circuits, and concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation of a hybrid computing system to generate approximate equilibrium statistics, the hybrid computing system comprising an analog processor and a digital processor, the method comprising:
   determining an intermediate value of an annealing parameter, the annealing parameter normalized between a value of zero and a value of one;
   determining a ramp time $t_{ramp}$ wherein $t_{ramp}$ is smaller than the relaxation time of the analog processor and greater than a time needed for non-adiabatic transition to higher energy states;
   initializing the analog processor in a first state;
   evolving the analog processor from a value of one for the annealing parameter until the annealing parameter is equal to the intermediate value, wherein evolving the analog processor from a value of one for the annealing parameter until the annealing parameter is equal to the intermediate value occurs in the ramp time;
   holding the annealing parameter of the analog processor to the intermediate value for a predetermined dwell time;
   evolving the analog processor from the intermediate value of the annealing parameter until the annealing parameter is equal to one, wherein evolving the analog processor from the intermediate value of the annealing parameter until the annealing parameter is equal to one occurs in the ramp time and after the ramp time the analog processor is in a second state; and
   reading out the second state of the analog processor.

2. The method of operation of claim 1 wherein determining an intermediate value of an annealing parameter, the annealing parameter normalized between a value of zero and a value of one comprises determining a value of the annealing parameter where the evolution of the analog processor starts deviating toward a distribution that is not a Boltzmann distribution.

3. The method of operation of claim 1 wherein initializing the analog processor in a first state comprises initializing the state of the analog processor via the digital processor to correspond to a distribution of interest.

4. The method of operation of claim 1 wherein initializing, the analog processor in a first state comprises evolving the analog processor from an end state of a previous annealing operation.

5. The method of claim 1 wherein the dwell time is a time greater than a time needed for the evolution of the analog processor to recover from any distortion caused by evolving the analog processor by the ramp time.

6. The method of claim 1 wherein reading out the second state of the analog processor comprises reading out the second state of the analog processor with the digital processor.

7. The method of claim 1 wherein the second state is not equal the first state.

8. The method of claim 7 wherein the second state is a sample from a distribution obtained from an evolution in $t_{ramp}$ from a thermal equilibrium distribution $$P_\beta(z) = \frac{e^{-\beta E(z)}}{Z_\beta}.$$

9. The method of claim 1, further comprising: after reading out the second state of the analog processor, post-processing the second state via the digital processor to obtain a third state of the analog processor.

10. The method of claim 9 wherein post-processing the second state of the quantum processor comprises applying one or more passes of quantum Monte Carlo simulations to the second state.

11. The method of claim 9, further comprising: assigning importance weights to the third state of the analog processor via the digital processor.

12. The method of claim 1, further comprising:
obtaining a first intermediate state by the digital processor, the first intermediate state corresponding to a first quantum state and generated according to a classical Markov Chain Monte Carlo method;
converting the first intermediate state to the first state, the first state comprising a classical state representable by the analog processor;
in response to reading out the second state of the analog processor, converting the second state to a second intermediate state by the digital processor, the second intermediate state corresponding to a second quantum state and representable by the classical Markov Chain Monte Carlo method; and
performing, by the digital processor, an update operation in the classical Markov Chain Monte Carlo Method based on the second intermediate state.

13. The method of claim 12 wherein converting the first intermediate state to the first state comprises forward-annealing via the Markov Chain Monte Carlo method from the first intermediate state to the first state.

14. The method of claim 13 wherein obtaining a first intermediate state by the digital processor comprises forward-annealing at a first annealing rate and forward-annealing from the first intermediate state to the first state comprises annealing at a second annealing rate, the second annealing rate faster than the first annealing rate.

15. The method of claim 12 wherein converting the first intermediate state to the first state comprises determining a projection from the first intermediate state to the first state.

16. The method of claim 12 wherein converting the second state to the second intermediate state comprises reverse-annealing via the Markov Chain Monte Carlo method from the first intermediate state to the first state.

17. A computational system, comprising:
at least one digital processor in communication with an analog processor; and
at least one nontransitory processor-readable storage medium that stores at least one of processor-executable instructions or data which, when executed by the at least one digital processor cause the at least one digital processor to:
determine an intermediate value of an annealing parameter, the annealing parameter normalized between a value of zero and a value of one;
determine a ramp time tramp wherein tramp is smaller than the relaxation time of the analog processor and greater than a time needed for non-adiabatic transition to higher energy states;
instruct the analog processor to:
initialize the analog processor in a first state;
evolve, in the ramp time, the analog processor from a value of one for the annealing parameter until the annealing parameter is equal to the intermediate value;
hold the annealing parameter of the analog processor to the intermediate value for a predetermined dwell time;
evolve, in the ramp time, the analog processor from the intermediate value of the annealing parameter until the annealing parameter is equal to one;
hold the analog processor in a second state after evolving the analog processor from the intermediate value of the annealing parameter; and
reading out the second state of the analog processor.

18. The computing system of claim 17 wherein the processor-executable instructions or data further comprise instructions or data which, when executed, cause the at least one digital processor to: post-process the second state to obtain a third state of the analog processor.

19. The computing system of claim 18 wherein to post-process the second state of the quantum processor, instructions or data cause the at least one digital processor to apply one or more passes of quantum Monte Carlo simulations to the second state.

20. The computing system of claim 17 wherein the processor-executable instructions or data further comprise instructions or data which, when executed, cause the at least one digital processor to:
obtain a first intermediate state by the digital processor, the first intermediate state corresponding to a first quantum state and generated according to a classical Markov Chain Monte Carlo method;
convert the first intermediate state to the first state, the first state comprising a classical state representable by the analog processor;
convert the second state to a second intermediate state in response to reading out the second state of the analog processor, the second intermediate state corresponding to a second quantum state and representable by the classical Markov Chain Monte Carlo method; and
perform an update operation in the classical Markov Chain Monte Carlo Method based on the second intermediate state.

* * * * *